United States Patent Office 3,300,537
Patented Jan. 24, 1967

3,300,537
FLUORINATION OF PERHALOCOMPOUNDS
Royston Henry Bennett and George Fuller, Avonmouth, England, assignors to The National Smelting Company Limited, London, England, a British company
No Drawing. Filed Oct. 21, 1963, Ser. No. 317,805
Claims priority, application Great Britain, Oct. 23, 1962, 40,028/62
11 Claims. (Cl. 260—649)

The invention relates to the reactions of aromatic compounds containing only carbon and halogen atoms with ionic, monovalent metal fluorides in order to substitute fluorine atoms for other halogen atoms in the aromatic ring. The reactions are carried out in the absence of solvents.

It is generally considered that for this type of replacement to occur, the aromatic halogens (i.e. chlorine, bromine or iodine) must be activated by groups such as nitro or carbonyl. For example, p-chloronitrobenzene may be treated with caesium fluoride at 190–200° C. to give a 75% to 80% yield of p-fluoronitrobenzene, (Vorozhtsov and Zakobson; Zh. Obshch. Khim., 31, 3505–8), while 4-chlorophthalic anhydride may be converted to the 4-fluoro compound by heating with potassium fluoride to 200° C. (B.P. 755,668).

It has now been discovered that halogen atoms attached to aromatic rings may be substituted by fluorine atoms, in aromatic compounds containing carbon and halogen atoms only, i.e. not containing activating groups. The substitution may be carried out by heating the aromatic compound with dry, i.e., essentially anhydrous, monovalent fluorides, preferably alkali metal fluorides.

The invention consists in a process for the production of aromatic perhalogenocarbons containing fluorine atoms attached to the aromatic nucleus in which an aromatic compound containing carbon and halogen atoms only including at least one halogen atom other than fluorine is heated with at least one dry monovalent metal fluoride in the absence of solvents and at a temperature between 300 and 750° C.

The metal fluoride may be pelleted or used in the form of a powder, i.e. a solid form of the material. The reactions can be carried out at subatmospheric, atmospheric or super-atmospheric pressures but pressures in the range of 10 to 50 atmospheres are preferred. Flow systems may be used but sealed pressure vessels, e.g. autoclaves, are the preferred apparatus for carrying out this process.

The temperature at which the fluorination is carried out depends upon the metal fluoride used, the number of halogen atoms which it is desired to replace and the number of fluorine atoms present in the organic starting material. In general, both the thermal stability of the perhalogenofluoroaromatics and the difficulty of replacement of halogen atoms by fluorine increase with increasing fluorine content. Thus, the fluorination of hexachlorobenzene may be conducted in the temperature range 300–750° C., with temperatures of 500–600° C. being preferred for the production of highly fluorinated aromatics such as hexafluorobenzene and chloropentafluorobenzene in high yields and temperatures in the lower part of the range being preferred for the production of less highly fluorinated chlorofluorobenzenes, such as dichlorotetrafluorobenzene and trichlorotrifluorobenzene in high yields. The fluorination of octachloronaphthalene may be conducted in the temperature range 300–550° C., preferably 400–500° C. It may be desirable, in certain fluorinations, to increase the temperature during the course of the reaction.

Alkali metal fluorides are the preferred fluorinating agents for this process. These vary in activity from lithium fluoride which is the least active to caesium fluoride which is the most active fluorinating agent. The fluorination reaction using lithium fluoride is very slow and the perhalogenoaromatic product using hexachlorobenzene as a starting material contains only traces of dichlorotetrafluorobenzene. When sodium fluoride is used, fluorination proceeds more rapidly and the major product from the fluorination of hexachlorobenzene with this reagent are pentachlorofluorobenzene, tetrachlorodifluorobenzene, trichlorotrifluorobenzene and dichlorotetrafluorobenzene with only traces of chloropentafluorobenzene and hexafluorobenzene being formed. Using potassium rubidium or caesium fluorides, highly fluorinated compounds, hexafluorobenzene and chloropentafluorobenzene may be prepared in good yield. Potassium fluoride is the preferred reagent for producing such compounds and the expensive rubidium or caesium fluorides would only be used for the replacement of extremely inert halogen atoms. In fluorinations using less active fluorides or where the maximum substitution of fluorine is required, an excess of the fluoride is preferred.

For any given metal halide, the efficiency of the halide as a fluorinating agent is dependent upon the surface area and this may be varied by using different procedures for its preparation. The surface area may be increased by crushing or by the use of other physical means of attrition, obvious to those familiar with the art.

A particular embodiment of the invention is the fluorination of hexachlorobenzene using potassium fluoride to produce highly fluorinated chlorofluorobenzenes and hexafluorobenzene in good yields.

The invention further consists in the fluorinated aromatic compounds whenever prepared by the method described in the preceding paragraphs.

The compounds produced by these reactions which are in general known per se are useful as heat transfer media of high stability to heat and radiation and as intermediates in the preparation of other fluorinated aromatic compounds. Hexafluorobenzene is useful in applications where a high resistance to degradation by ionising radiations, together with non-inflammability and high chemical stability is required. Thus it can be used as a cooling fluid in a region subject to nuclear radiation. The highly fluorinated products from the fluorination of hexachlorobenzene can be used to prepare compounds containing pentafluorophenyl, chlorotetrafluorophenyl and tetrafluorophenylene groupings. In particular, the dichlorotetrafluorobenzene contains the chlorine atoms mainly in meta orientation and thus this compound is of special value in the preparation of meta disubstitute tetrafluorobenzenes, which are extremely difficult to synthesise by other means.

The invention as described shows the following main advantages over other methods of preparing fluorinated aromatic compounds:

(1) A range of perhalogeno aromatic compounds containing fluorine can be prepared in a one-stage process which may be operated in conventional process equipment.

(2) The process variables may be readily varied in order to give products of any desired fluorine content.

(3) Highly fluorinated aromatic compounds can be produced without recourse to the use of elementary fluorine which is expensive and requires specialised equipment.

(4) The metal fluorides used may be regenerated after use by known reactions using the inexpensive hydrogen fluoride as a source of fluorine.

(5) Separation of individual perhalogeno aromatic compounds is relatively easily accomplished by fractional distillation.

(6) In the fluorination of hexachlorobenzene, the products are produced in excellent yields from an inexpensive and readily available starting material.

The invention will be further described with reference to the following non-limiting examples.

Example 1

1.60 g. each of hexachlorobenzene and high purity sodium fluoride powder were placed in a thick walled "Pyrex" tube of about 100 ml. capacity, dried at 100° C. in vacuo and sealed. The tube was heated for 5 hours in a tube furnace at 450° C. in such a manner that it was rapidly brought to this temperature and rapidly cooled at the end of the heating period. The tube was then opened and the contents extracted with chloroform, the solution giving a white solid (0.91 g.) on evaporation. On analysis by infra-red spectroscopy this was found to contain:

|  | G. |
|---|---|
| Hexachlorobenzene | 0.58 |
| Pentachlorofluorobenzene | 0.28 |
| Tetrachlorodifluorobenzene | 0.04 | fluorobenzene condensed in. The tube was sealed in vacuo and heated to 400° C. for 5 hours, cooled, opened and 1.15 g. of volatile product obtained. This consisted of:

|  | G. |
|---|---|
| Hexafluorobenzene | 1.06 |
| Chloropentafluorobenzene | 0.06 |
| Carbon dioxide | 0.03 |

Note: The carbon dioxide probably arose from the reaction of the organic compounds with the glass tube.

In Examples 4 to 11 the alkali fluoride used was dried and placed in a Nimonic 75 alloy autoclave of about 60 ml. capacity, together with the aromatic perhalocarbon. The autoclave was pressurised with nitrogen to reduce diffusion of organic compounds into the pressure gauge and other connections and then heated to the reaction temperature over a period of about one hour. After the stated reaction time had elapsed the autoclave was cooled over a period of about one hour and the volatile products removed by evacuation through cold traps. The spent alkali fluoride was extracted with carbon tetrachloride if necessary and the products examined by gas chromatography and, where possible, by infra-red spectroscopy.

|  | Example No. | | | | | | | |
|---|---|---|---|---|---|---|---|---|
|  | 4 | 5 | 6 | 7 | 8 | 9 | 10 | 11 |
| Alkali fluoride | KF | Crushed KF | KF | KF prep. from KHF$_2$ | KF | NaF | LiF | KF |
| Weight (g.) | 12.4 | 12.3 | 11.9 | 11.9 | 34.6 | 36.0 | 22.0 | 12.95 |
| Perhalocarbon | Hexachlorobenzene | | | | | | | 1:2-di-Br C$_6$F$_4$ |
| Weight (g.) | 8.0 | 8.0 | 8.0 | 8.0 | 7.0 | 8.0 | 8.0 | 14.9 |
| N$_2$, p.s.i.g. at room temp | 20 | 30 | 50 | 50 | 30 | 50 | 30 | 50 |
| Temp. of reaction (° C.) | 500 | 505 | 540 | 540 | 500 | 500 | 500 | 500 |
| Reaction time (hrs.) | 9¾ | 9¾ | 2½ | 2½ | 10 | 16 | 12 | 4 |
| Max. pressure obtained (p.s.i.g.) | 365 | N.D. | 530 | 540 | 450 | 520 | 570 | 615 |
| Weight organic products (g.) | 5.37 | 5.41 | 5.19 | 5.11 | 4.59 | 6.05 | 4.50 | 8.40 |
| C$_6$Cl$_6$ | 0.02 | 0.01 |  | 0.01 |  | 0.17 | 3.66 |  |
| C$_6$Cl$_5$F | 0.07 | 0.03 |  | 0.02 |  | 1.15 | 0.19 |  |
| C$_6$Cl$_4$F$_2$ | 0.39 | 0.15 | 0.01 | 0.05 | 0.07 | 2.00 | 0.27 |  |
| C$_6$Cl$_3$F$_3$ | 1.31 | 0.45 | 0.12 | 0.14 | 0.11 | 1.96 | 0.23 |  |
| C$_6$Cl$_2$F$_4$ | 1.79 | 0.95 | 0.53 | 0.45 | 0.28 | 0.68 | 0.03 |  |
| C$_6$ClF$_5$ | 1.28 | 2.03 | 1.73 | 1.62 | 1.26 | 0.08 |  |  |
| C$_6$F$_6$ | 0.42 | 1.68 | 2.51 | 2.39 | 2.86 | 0.01 |  |  |
| C$_6$Br$_2$F$_4$ |  |  |  |  |  |  |  | 2.47 |
| C$_6$BrF$_5$ |  |  |  |  |  |  |  | 1.18 |
| C$_6$F$_5$.C$_6$F$_5$ |  |  |  |  |  |  |  | 1.44 |
|  |  |  |  |  |  |  |  | 1.55 |
| Unidentified compounds | 0.09 | 0.11 | 0.27 | 0.43 | 0.01 |  | 0.12 | 1.76 |

NOTES:
(1) Unless otherwise stated the KF used is laboratory reagent quality.
(2) The KF used for Example 5 was produced by milling in a tungsten carbide ball mill.
(3) The decafluorobiphenyl found in Example 11 was presumably formed by pyrolysis of C$_6$BrF$_5$ present.

the calculated pressure of organic compounds developed during this experiment was about 4 atmospheres.

Example 2

2.0 g. of hexachlorobenzene and 2.7 g. of potassium fluoride were placed in a Pyrex tube of about 100 ml. capacity and dried by heating to 185° C. in vacuo sealed. The tube was then heated to 400° C. for 5 hours in a manner similar to that used in Example 1. The tube was opened and the contents extracted with ether, the solution giving on evaporation a product (1.16 g.) that was just liquid at room temperature. This analysed by gas-liquid chromatography and infra-red spectroscopy as follows:

|  | G. |
|---|---|
| Hexachlorobenzene | 0.01 |
| Pentachlorofluorobenzene | 0.04 |
| Tetrachlorodifluorobenzene | 0.38 |
| Trichlorotrifluorobenzene | 0.58 |
| Dichlorotetrafluorobenzene | 0.11 | plus small amounts of unidentified products.

Example 3

3.35 g. of 99% pure caesium fluoride was placed in a Pyrex tube of about 100 ml. capacity, dried at about 200° C. in vacuo, cooled and 2.00 g. of 97% pure chloropenta-

Example 12

4.00 g. of octachloronaphthalene and 15.09 g. of dried potassium fluoride were reacted for 8 hours at 450° C. using the apparatus and procedure described for Examples 4–11. The product (2.02 g.) consisted of octafluoronaphthalene: 1.65 g., chloroheptafluoronaphthalene: 0.32 g., other chlorofluoronaphthalenes and other unidentified compounds: 0.05 g.

Example 13

4.00 g. of octachloronaphthalene and 15.50 g. of dried sodium fluoride were reacted for 8¾ hours at 450° C. using the apparatus and procedure described for Examples 4–11. The product (1.70 g.) consisted of octafluoronaphthalene: 0.09 g., chloroheptafluoronaphthalene: 0.16, other chlorofluoronaphthalenes: 0.51 g., unidentified compounds: 0.94 g.

Example 14

2.00 g. of crude decachlorobiphenyl and 19.98 g. of dried potassium fluoride were reacted for 8 hours at 500° C. using the apparatus and procedure described for Examples 4–11. The product (0.96 g.) consisted of decafluorobiphenyl: 0.62 g., and unidentified compounds: 0.34 g.

We claim:
1. A process for the production of aromatic perhalogenocarbons containing fluorine atoms attached to the aromatic nucleus in which an aromatic compound containing carbon and halogen atoms only including at least one halogen atom other than fluorine is heated under pressure with at least one dry essentially anhydrous solid monovalent alkali metal fluoride in the absence of solvents and at a temperature between 300 and 750° C.

2. A process according to claim 1 wherein the heating is carried out in a sealed reactor.

3. A process as claimed in claim 1 in which the aromatic compound used is a perhalocompound of formula $C_6Cl_nF_{6-n}$ where $n$ is an integer between one and six.

4. A process according to claim 3 where the alkali metal fluoride is selected from the group consisting of caesium, rubidium and potassium fluoride and mixture thereof.

5. A process according to claim 3 in which $n$ is an integer from 3 to 6 inclusive; the alkali metal fluoride used is potassium fluoride; and the temperature is between 400 and 600° C.

6. A process according to claim 3 in which $n$ is an integer selected from the group consisting of 1 and 2; the alkali metal fluoride is potassium fluoride; and the temperature is between 400° and 600° C.

7. A process according to claim 3 in which the alkali metal fluoride used is potassium fluoride; the temperature is between 500° C. and 600° C.; and the pressure is between 20 and 50 atmospheres.

8. A process according to claim 1 in which the aromatic compound used is a perhalogenobenzene of formula $C_6Br_nF_{6-n}$ where $n$ is between one and six, and the temperature is between 350 and 550° C.

9. A process according to claim 1 in which the aromatic compound used is a perhalogenonaphthalene of formula $C_{10}Cl_nF_{8-n}$, where $n$ is between one and eight and the temperature is between 300 and 550° C.

10. A process according to claim 1 in which the aromatic compound used is a perhalogeno biphenyl of formula $C_{12}Cl_nF_{10-n}$, where $n$ is between 1 and 10.

11. A process according to claim 10, in which the alkali metal fluoride used is selected from the group consisting of caesium, rubidium, potassium and sodium fluoride or a mixture of these and the temperature is between 350° C. and 650° C.

References Cited by the Examiner

Hudlicky: "Chemistry of Org. Fluorine Comp." (Dec. 31, 1961), p. 104.

Finger et al.: Resume Des Comm. Div. De Chim Org., vol. II, p. 303.

BERNARD HELFIN, *Primary Examiner.*

LEON ZITVER, *Examiner.*

K. H. JOHNSON, K. V. ROCKEY, *Assistant Examiners.*